May 7, 1957 C. SCHRAMM 2,791,421
BOOK SIGNATURE TRANSFER MECHANISM
Filed Dec. 2, 1953 5 Sheets-Sheet 1

INVENTOR.
CARL SCHRAMM
BY
S. Jay Teller
ATTORNEY

May 7, 1957  C. SCHRAMM  2,791,421
BOOK SIGNATURE TRANSFER MECHANISM
Filed Dec. 2, 1953  5 Sheets-Sheet 2

INVENTOR.
CARL SCHRAMM
BY S. Jay Teller
ATTORNEY

May 7, 1957  C. SCHRAMM  2,791,421
BOOK SIGNATURE TRANSFER MECHANISM
Filed Dec. 2, 1953  5 Sheets-Sheet 3

INVENTOR.
CARL SCHRAMM
BY Jay Teller
ATTORNEY

May 7, 1957 C. SCHRAMM 2,791,421
BOOK SIGNATURE TRANSFER MECHANISM
Filed Dec. 2, 1953 5 Sheets-Sheet 4

INVENTOR.
CARL SCHRAMM
BY
S. Jay Teller
ATTORNEY

INVENTOR.
CARL SCHRAMM
BY
ATTORNEY

United States Patent Office 2,791,421
Patented May 7, 1957

2,791,421

BOOK SIGNATURE TRANSFER MECHANISM

Carl Schramm, North Coventry, Conn., assignor to The Smyth Manufacturing Company, Hartford, Conn., a corporation of Connecticut Application December 2, 1953, Serial No. 395,751

26 Claims. (Cl. 270—54)

The invention relates to a book signature transfer mechanism particularly adapted for use in or as a part of a machine of the type disclosed in the Schramm Patent No. 2,025,527 dated December 24, 1935, and entitled Book Signature Feed. In a machine of the said type, mechanism is provided for feeding book signatures successively from a stack and for delivering them to a transfer position wherein they are located with their two sections extending downwardly and at opposite sides of a longitudinal central plane. The signatures are opened and transferred generally downwardly from the transfer position to a saddle and they are then moved lengthwise of the saddle for subsequent operations.

Each signature ordinarily comprises two or more separate sheets folded together and each of the downwardly extending sections of the signature therefor comprises two or more separate leaves. As shown in the said patent, transfer units comprising suction cups are provided for engaging the outer leaves of the signature sections for opening the signatures and for transferring them downwardly from the transfer position to the saddle. The suction cups engage only the outer leaves of the signature sections and there is no means for positively engaging the signature sections so that all of the separate leaves thereof will be assuredly separated.

One object of the present invention is to provide a transfer mechanism which includes transfer or gripper units having abutments and cooperating relatively movable fingers for engaging the outer and inner leaves of each section of the signature so that all of the leaves of the signature sections are positively held as they are moved downwardly.

The signatures may be formed or folded so that one of the sections thereof is wider than the other, the lower edges of the two sections being at different levels when the signature is in the transfer position. A further object of the invention is to provide a transfer mechanism such as referred to in the last preceding paragraph wherein one gripper unit is positioned to engage the lower portion of the wider signature section so as to move the said section away from the other section, thus preliminarily opening the signature for the immediately following gripping of the sections thereof by the said units.

Another object of the invention is to provide a transfer mechanism such as referred to in the last preceding paragraph wherein the gripper units are relatively shiftable so that they can open and grip signatures having their wider sections at either side.

The several signatures for each successive hook may be arranged in the stack so that the signatures of a first group are positioned to have their wider sections at one side and so that the signatures of a second group are oppositely positioned to have their wider sections at the opposite side. A still further object of the invention is to provide a transfer mechanism such as referred to in the last preceding paragraph wherein periodically acting means is provided for automatically adjusting the gripper units so that they act alternately to engage the wider signature sections at successively opposite sides in successive groups.

A further more specific object of the invention is to provide periodically acting means which are mechanically operated for automatically adjusting the gripper units as aforesaid.

A still further more specific object of the invention is to alternatively provide periodically acting means which are pneumatically operated for automatically adjusting the gripper units as aforesaid.

Still further objects will be apparent from the drawings and from the following description.

In the drawings I have shown in detail two alternative embodiments of the invention, but it will be understood that various changes may be made from the constructions shown, and that the drawings are not to be construed as defining or limiting the scope of the invention, the claims forming a part of this specification being relied upon for that purpose.

*Mechanism as shown in Figs. 1 to 15*

Figures 1, 2, 3, 4:
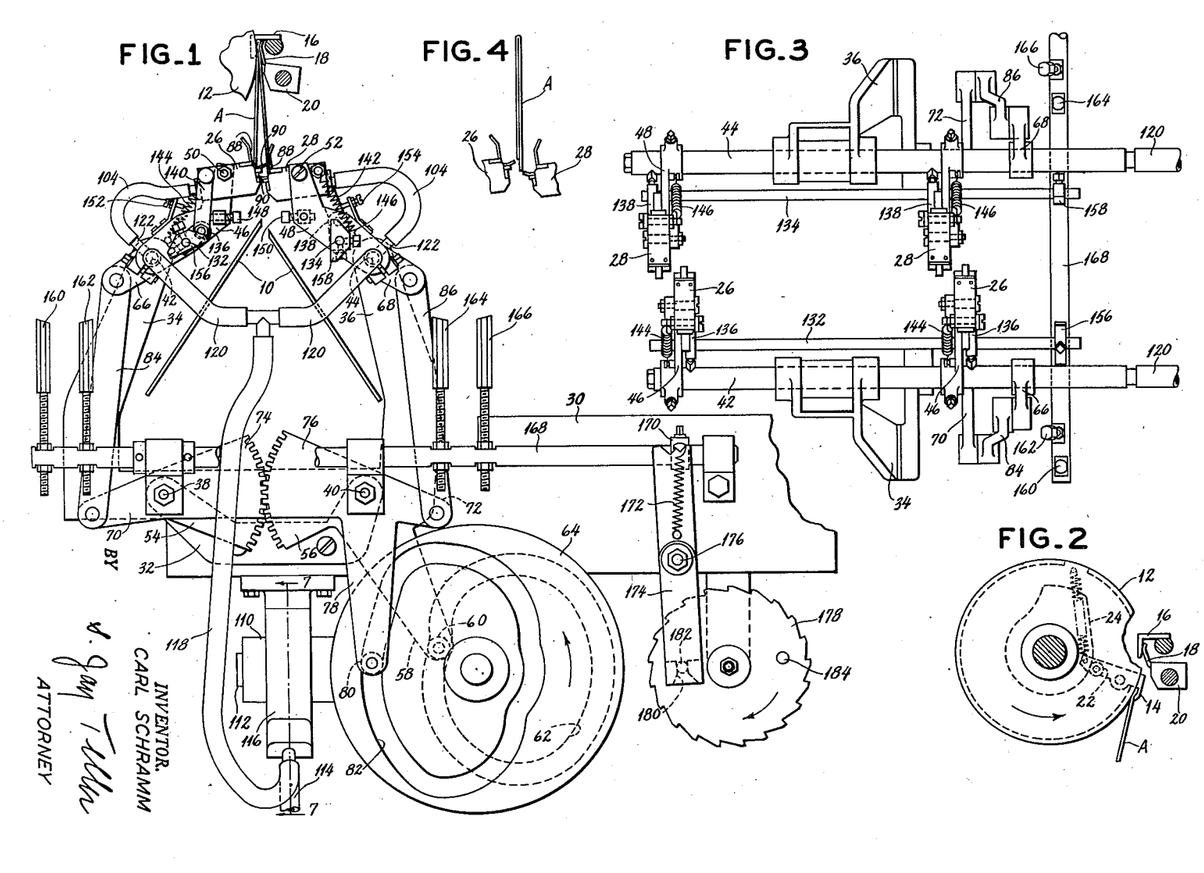
Fig. 1 is a side view of a hook signature transfer mechanism embodying the invention.
Fig. 2 is a fragmentary side view of a mechanism for supplying book signatures to the transfer mechanism shown in Fig. 1.
Fig. 3 is a plan view of some of the parts shown in Fig. 1.
Fig. 4 is a fragmentary view similar to the upper central portion of Fig. 1 but showing some of the parts in different relative positions.

Referring particularly to Figs. 1 and 2 of the drawings, A represents a book signature which is to be opened and placed upon a transverse stationary saddle 10 having an inverted V-shape. Signatures such as A are successively delivered to the transfer position shown in Fig. 1 and are then released, one signature being delivered and released during each cycle of the machine. Each signature is folded to provide two sections which extend downwardly at opposite sides of a longitudinal central plane, and each signature ordinarily comprises two or more sheets with two or more leaves in each section. By the mechanism embodying the invention, the signatures are successively opened and are transferred downwardly and onto the saddle 10. After being placed on the saddle the signatures are moved lengthwise of the saddle or transversely of the machine to a position for subsequent operations. The mechanism for transferring the signatures lengthwise of the saddle may be the same as or equivalent to the mechanism for this purpose disclosed in the said Patent 2,025,527.

Fig. 2 shows a portion of the mechanism for delivering the signatures to the transfer position shown in Fig. 1, reference being made to the said Patent 2,025,527 for a full disclosure of the said mechanism. One or more discs 12 are provided which are rotated counterclockwise about a transverse axis and which make one rotation during each cycle. Each disc carries a pivoted finger 14 which is spring pressed to clamp the upper edge portion of the signature against the disc. Stationary stripper fingers 16 are located in the path of movement of the signatures, and spring fingers 18 cooperate with the said stripper fingers. The spring fingers 18 are carried by a block 20 which is pivotally movable about a fixed transverse axis.

When the disc 12 rotates slightly beyond the position shown in Fig. 2, the signature A is forced between the stripper fingers 16 and the spring fingers 18. Simultaneously with the engagement of the signature with the stripper fingers, each finger 14 is moved relatively to the disc 12 by a roller 22 engaging a cam 24, the signature being thus released. When released thereby, the finger 14 on the signature is held by the fingers 16 and 18. Thereafter, the block 20 is pivotally moved so as to move the spring fingers 18 to the position shown in Fig. 1, the signature being then released for downward movement by the transfer mechanism.

While not necessarily so limited, mechanism embodying the present invention is particularly adapted for use with signatures each of which has the section thereof at one side wider than the section thereof at the other side. As shown in Fig. 1, the wider section is at the right. The narrower and wider sections are engaged respectively by two gripper units 26 and 28, as shown in Figs. 1 and 3. The two units constitute a pair, and the units of the pair are relatively offset from each other transversely so as to be out of longitudinal register. The description which follows applies particularly to the pair of units and the moving and controlling means therefor which are shown in Fig. 1 and which appear at the right in Fig. 3. All details of construction and all relative movements to be described are equally applicable to the pair of gripper units which appear at the left in Fig. 3. The units of the two pairs and various elements of the moving and controlling means are respectively in transverse alignment.

A portion of the main framework of the machine is shown at 30 and a bracket 32 projects from the said framework. Two arms 34 and 36 are provided which respectively serve in cooperation with other parts to carry and move the gripper units 26 and 28. The said arms are mounted for pivotal movements about fixed transverse pivot pins 38 and 40 which are at the same level and which may be carried by the bracket 32. The said arms 34 and 36 are generally similar but are reversed in shape and they are oppositely angulated as shown so as to extend partly around the saddle 10. Transverse tubular shafts 42 and 44 are carried by the respective arms 34 and 36 in suitable bearings thereon, the said shafts being adapted for rotative movements about their own axes. Rigidly connected respectively with the shafts 42 and 44 are arms 46 and 48, the said gripper units being carried respectively by the said arms. The gripper units are preferably pivotally movable relatively to the arms 46 and 48 and are respectively connected therewith by transverse pivot pins 50 and 52. Although the gripper units are preferably relatively movable pivotally, it will be assumed in the immediately following description that they remain in the relationship to the arms 46 and 48 as shown in Fig. 1.

Figures 9, 10, 11, 12, 13:
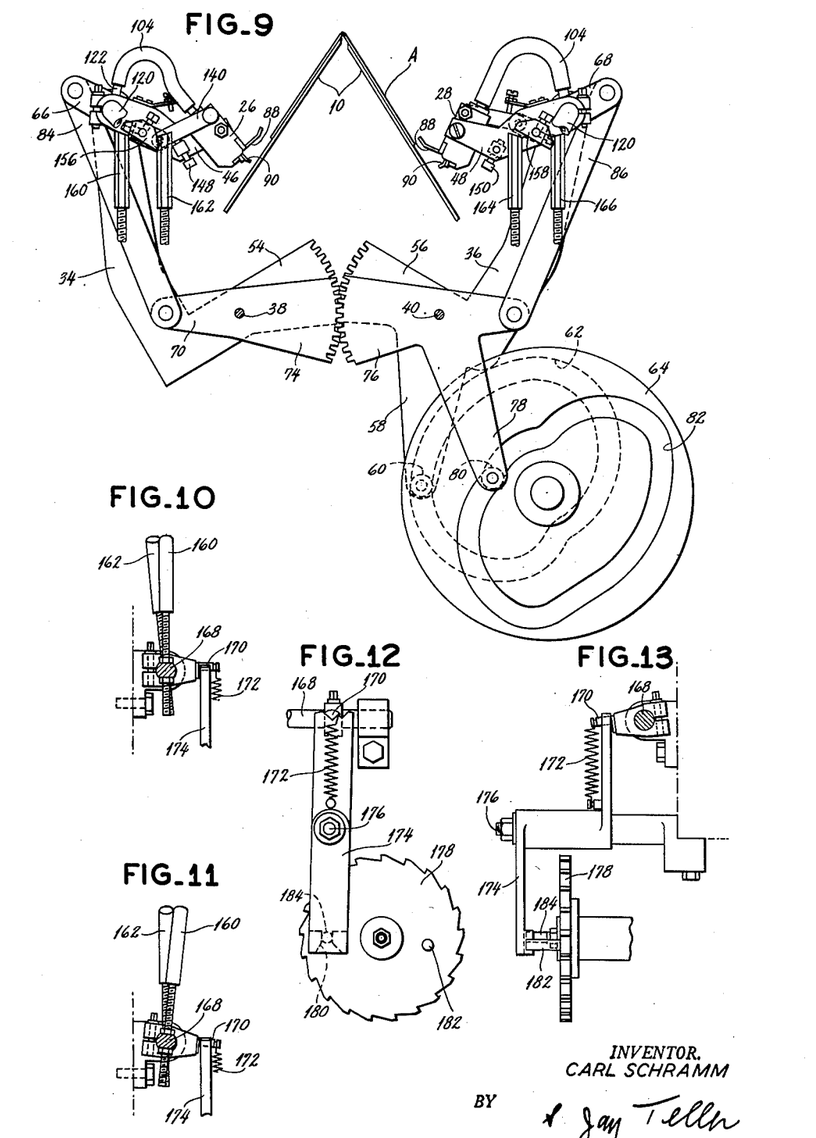
Fig. 9 is a fragmentary view similar to Fig. 1 but showing various parts in different positions.
Fig. 10 is a fragmentary left elevational view of some of the parts shown in Fig. 1.
Fig. 11 is a view similar to Fig. 10 but showing some of the parts in different positions.
Fig. 12 is a fragmentary side view similar to the lower right portion of Fig. 1 but showing some of the parts in different positions.
Fig. 13 is a right end view of the parts shown in Fig. 12.

Connected to or formed integrally with the arms 34 and 36 are intermeshing gear segments 54 and 56. One of the arms, as for instance the arm 36, has a downward extension 58 which carries a roller 60 entering a cam groove 62 in the far side of a rotatable cam disc 64. The cam disc 64 makes one rotation during each machine cycle, and during each rotation the extension 58 is oscillated. By reason of the meshing gear segments 54 and 56, the arms 34 and 36 are oscillated uniformly and in opposite directions during each cycle. Fig. 1 shows the arms with the minimum space between them and Fig. 9 shows the arms with the maximum space between them.

Rigidly connected respectively with the shafts 42 and 44 are arms 66 and 68. Pivotally mounted respectively on the said pins 38 and 40 are levers 70 and 72. Connected to or formed integrally with the levers 70 and 72 are intermeshing gear segments 74 and 76 which are in front of the gear segments 54 and 56. One of the levers, as for instance the lever 72, has a downward extension 78 which carries a roller 80 entered in a cam groove 82 in the near side of the said cam disc 64. During each rotation of the cam disc the extension 78 is oscillated, and by reason of the intermeshing gear segments 74 and 76, the levers 70 and 72 are oscillated uniformly and in opposite directions during each cycle. A link 84 connects the lever 70 with the arm 66 and a similar link 86 connects the lever 72 with the arm 68.

From the drawings and the foregoing description it will be apparent that during each cycle the arms 34 and 36 are oscillated about their fixed axes and the arms 66 and 68 are oscillated about their movable axes on the arms 34 and 36. The arms 66 and 68 serve to relatively turn the shafts 42 and 44 and to thus relatively oscillate the arms 46 and 48 and the gripper units 26 and 28. The cam grooves 62 and 82 are so shaped and related that the described combined oscillations cause the inner portions of the gripper units to have diverging generally downward movements in approximate parallelism with the sides of the saddle 10 from the upper gripping positions shown in Fig. 1 to the lower releasing positions shown in Fig. 9. The said cam grooves 62 and 82 are further so shaped and related that the gripper units in moving from the Fig. 9 positions back to the Fig. 1 positions pass through intermediate positions such as shown in Fig. 4. In the Fig. 4 positions, the gripper units are at about the same level as in Fig. 1 or at a slightly lower level. For reasons to be more fully set forth, it is necessary that the gripper units be moved in generally longitudinal directions from positions such as shown in Fig. 4 to the positions shown in Fig. 1. From the foregoing description it will be apparent that the units are reciprocated along downwardly diverging and upwardly converging paths between their upper gripping positions and their lower releasing positions. The units, while somewhat tilted during reciprocation, are always maintained in generally upright positions. The units are never inverted.

The gripper units 26 and 28 of each pair are so constructed and controlled that one of them, as it approaches its gripping position, moves into engagement with the lower portion of the wider signature section with resultant separation of the two sections. The separation of the sections is facilitated by the transversely offset relationship of the two units of each pair. The said gripper units include gripping means which are operated to grip the signature sections after separation thereof and when the said units are in their upper gripping positions as shown in Fig. 1 and which are operated to release the signature sections when the units are in their lower releasing positions as shown in Fig. 9.

Figure 5:
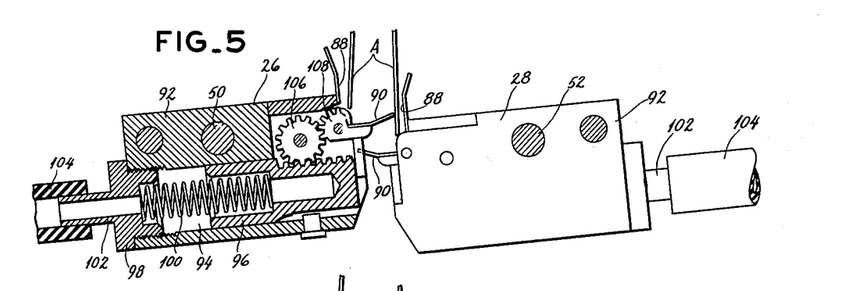
Fig. 5 is an enlarged vertical sectional view taken along the line 5—5 of Fig. 3.

Fig. 5 shows the gripper units 26 and 28 on a larger scale, the unit 26 at the left being shown in section. The details of the units 26 and 28 may be widely varied but each of them comprises an abutment 88 adapted to be moved to a position closely adjacent the lower portion of the corresponding signature section and also comprises a finger 90 movable relatively to the abutment so as to grip and release the said lower portion of the corresponding signature section. The finger is preferably movable pivotally about a transverse axis parallel with the central plane of the mechanism. The means for relatively moving the fingers is preferably pneumatically operated and as shown it is operated by suction.

Referring particularly to the unit 26, it will be seen that the unit comprises a main housing 92 having a transverse aperture for the pivot pin 50. The housing also has a longitudinal cylindrical chamber 94 for a longitudinally movable piston 96. The chamber 94 is closed at the left by a centrally apertured plug 98 and a spring 100 interposed between the piston and the plug biases the piston for movement toward the right. The plug 98 has a nipple 102 for engaging a suction hose 104. A pinion 106 is located within the housing and is rotatable about a transverse axis, the pinion meshing with rack teeth formed on the piston 96. A segmental pinion 108 is located partly within the housing and is also rotatable about a transverse axis, the segmental pinion 108 meshing with the pinion 106. The pinion 102 carries the before mentioned gripping finger 90 which is preferably formed of spring metal and is in an approximately horizontal open position as shown in Fig. 5 when the piston 96 is toward the right. At the right end thereof the housing 92 carries a generally upright spring finger. The said spring finger and particularly the lower portion thereof constitutes the said abutment 88 for cooperation with the movable finger 90.

It will be understood that the gripper units 26 and 28 are identical in construction but are in reversed positions. In the positions shown in Figs. 1, 5 and 6, the unit 26 is inclined upwardly toward the right and the unit 28 is inclined downwardly toward the left. The result is that the finger 90 of the left unit 28 is at a higher level than the finger 90 of the right unit 28. This arrangement is suitable for signatures having their wider sections at the right as shown.

It has been stated that the gripper units in moving from the Fig. 9 positions to the Fig. 1 positions pass through positions such as shown in Fig. 4. The signature A has its longer section at the right, and as the unit 26 moves toward the right from its Fig. 4 position, the open finger 90 thereof passes under the narrower left section of the signature and engages the wider right section thereof so as to separate the right section from the left section. Therefore, when the gripper units reach the positions shown in Figs. 1 and 5, the abutments 88, 88 are adjacent the lower portions of the signature sections and the open left clamping finger 90 is beneath the narrower left signature section and the open right clamping finger 90 is beneath the wider right signature section.

Figure 6:
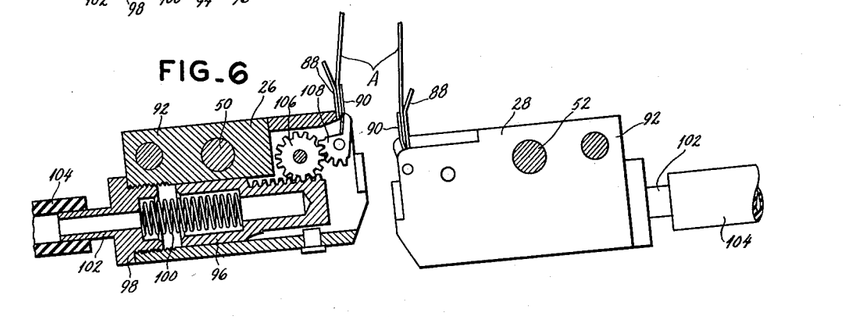
Fig. 6 is a view similar to Fig. 5 but showing some of the parts in different positions.

As soon as the gripper units reach the positions shown in Figs. 1 and 5, suction is applied through the hoses 104, 104. This varies or reduces the air pressure in the chambers 94, 94 and causes the left plunger 96 to move toward the left and causes the corresponding right plunger to move toward the right. The plungers in so moving serve to move the clamping fingers 90, 90 from their open positions as shown in Fig. 5 to their closed positions as shown in Fig. 6, the left and right sections of the signature being thus gripped between the fingers 90, 90 and the abutments 88, 88. Then the gripper units are moved downwardly as previously explained to the Fig. 9 positions, the signature being further opened and being deposited on the saddle 10. Immediately before reaching the Fig. 9 position, the suction is released and the springs 100 move the fingers 90 from their closed positions to their open positions as shown in Fig. 9, so as to release the sections of the signature.

Figure 7:
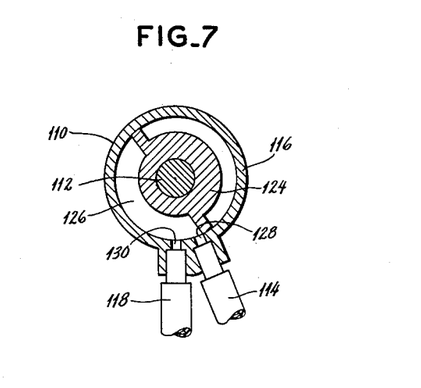
Fig. 7 is a vertical sectional view taken along the line 7—7 of Fig. 1 and showing the suction control valve of the mechanism.
Figure 8:
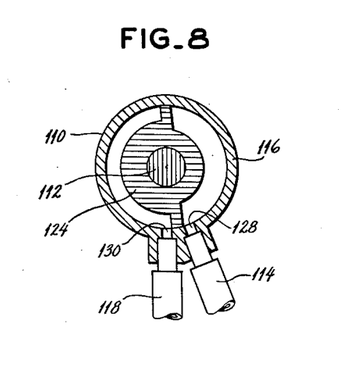
Fig. 8 is a view similar to Fig. 5 but showing the movable member of the valve in a different position.

It has been stated that suction is applied in the Fig. 1 positions to move the fingers 90 from their open positions to their closed positions and that suction is released immediately before the Fig. 9 positions are reached so as to move the fingers 90 from their closed positions to their open positions. The specific suction control means is not a part of the present invention but one suitable means is shown in Figs. 1, 7 and 8.

As shown, a suction control valve 110 is provided which is operated by a shaft 112, the said shaft being connected by means not shown to make one turn during each machine cycle. A hose 114 connects the casing 116 of the valve with a suitable suction pump and a hose 118 serves in conjunction with branch hoses 120, 120 to connect the casing of the valve with the tubular shafts 42 and 44. The shafts 42 and 44 are provided with nipples 122, 122 and the before mentioned hoses 104, 104 connect the last said nipples with the nipples 102, 102 on the gripper units 26 and 28. Thus, suction connections are provided from the valve casing 116 to the gripper units, but the gripper units are nevertheless freely movable.

The suction control valve may be constructed as shown in the said Patent No. 2,025,527. As shown in Figs. 7 and 8, the valve 110 includes a rotary interior member 124 connected to and driven by the shaft 112. The member 124 has a chamber 126 therein closed at its ends. Fig. 7 shows the member 124 in a position reached immediately upon the movements of the gripper units to the Fig. 1 positions. The member 124 has uncovered a port 128 for the hose 114 and has established a suction connection through the chamber 126 between the said hose 114 and the hose 118 thus causing the fingers 90 of the gripper units to grip the signature as shown in Fig. 6. Fig. 8 shows the member 124 in the position that it reaches immediately before the gripper units reach the Fig. 9 positions. The member 124 has interrupted the suction connection between the hoses 114 and 118 and has exposed a port 130 for the hose 118. The casing 116 is open at one end so that the vacuum is broken when the rotary member 124 is in the Fig. 8 position. This permits the springs 100 of the gripper units to move the fingers 90 thereof to their open positions as shown in Figs. 5 and 9, the signature sections being released as shown in the said Fig. 9.

As thus far described, it has been assumed that the signatures A are all positioned with their wider sections at the right. However, the signatures may be positioned with their wider sections at the left and the mechanism of the invention preferably includes provision for the last said positioning of the signatures. Furthermore, the signatures for one book may include one group of signatures with their wider sections at one side and another group of signatures with their wider sections at the opposite side. The numbers of the said signatures may be varied, but as a specific example, the signatures for one book may include a group of 11 signatures with their wider sections at the right and a group of 10 signatures with their wider sections at the left. The mechanism is shown as being constructed to engage and transfer 11 signatures with their wider sections at the right and to then automatically adapt itself to engage and transfer 10 signatures with their wider sections at the left. Then the machine again automatically adapts itself to repeat the 21 cycle pattern.

Figure 15:
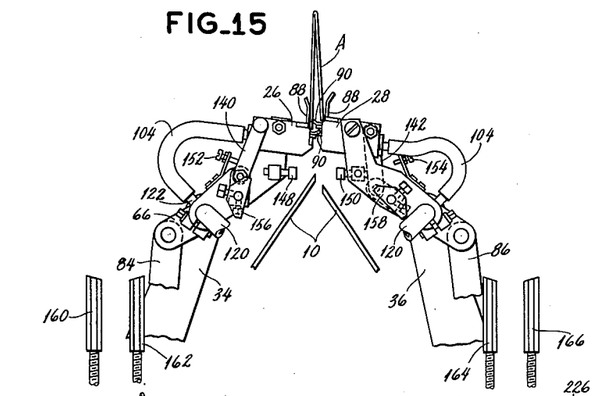
Fig. 15 is a view similar to the upper portion of Fig. 1 but showing some of the parts in different positions.

The relationship of the gripper units as shown in Figs. 1, 5 and 6 is adapted for signatures having their wider sections at the right and will be referred to as the first relationship. The gripper units are adjustable to a second relationship as shown in Fig. 15 wherein they are adapted for having their wider sections at the left. The arms 46 and 48 constitute first and second supporting members for the first and second gripper units 26 and 28, the units being movably connected, preferably pivotally, with their supporting members. When the gripper units are in their said first relationship as shown in Fig. 1, the right finger 90 for gripping the wider right section is lower than the left finger 90 for gripping the narrower left section. As the units approach the gripping positions, the higher left finger 90 engages the wider right section of the signature to separate the two sections. When the gripper units are in the second relationship as shown in Fig. 15, the left finger 90 for gripping the wider left section is lower than the right finger 90 for gripping the narrower right section. As the units approach the gripping positions, the higher right finger 90 engages the wider left section of the signature to separate the two sections.

Means is provided for moving the gripper units to the first relative positions shown in Figs. 1, 5 and 6 or to the second relative positions shown in Fig. 15. This means may be widely varied but, as shown, two shafts 132 and 134 are carried respectively by the arms 46 and 48, being spaced toward the central plane from the shafts 42 and 44. Rigidly secured to the shafts 132 and 134 are arms 136 and 138, these arms being connected respectively with the gripper units 26 and 28 by links 140 and 142. By relatively turning the shafts 132 and 134, the gripper units can be moved to the first relative positions shown in Fig. 1 or to the second relative positions shown in Fig. 15. The arms 136 and 138 cooperate with the links 140 and 142 to form toggle devices, and overcenter springs 144 and 146 serve to retain the gripper units in either of the said relative positions. Relative movements of the gripper units are limited in one direction by adjustable stops 148 and 150 and relative movements of the gripper units are limited in the other direction by adjustable stops 152 and 154. The said stops are engageable with the links 140 and 142. In the Fig. 1 positions the links 140 and 142 respectively engage the stops 148 and 154 and in the Fig. 15 positions the links 140 and 142 respectively engage the stops 152 and 150.

The gripper units may be shifted manually to either of their said relative positions. However, periodically operable means is preferably provided for shifting the units automatically in accordance with a prescribed pattern such as that previously mentioned. For relatively turning the shafts 132 and 134 automatically, shift dogs 156 and 158 are provided, these being rigidly secured to the said shafts. Tripper pins 160, 162, 164 and 166 are provided for engaging and moving the shift dogs 156 and 158. The said tripper pins are carried by and extend upwardly from a longitudinal rockshaft 168. The pins 160 and 164 are in longitudinal alignment with each other. When the various parts are in the relative positions shown in Figs. 1 and 9, the pins 160 and 164 are positioned vertically as shown in Figs. 3 and 10 and the left portions of the said dogs 156 and 158 are slightly above the tops of the said pins 160 and 164. The pins 162 and 166 are in longitudinal alignment with each other but they are inclined rearwardly or toward the left relatively to the pins 160 and 164 as shown in Figs. 3 and 10. In the Fig. 9 positions the right ends of the shift dogs 156 and 158 are in front of the upper portions of the pins 162 and 166 and do not engage them.

The rockshaft 168 and the several tripper pins can be moved from the positions shown in Fig. 10 to the positions shown in Fig. 11 and vice versa by a mechanism shown in the lower left portion of Fig. 1 and in Figs. 12 and 13. Secured to the shaft 168 is an arm 170 having a V-shaped cross section, a spring 172 being connected with the arm 170 for biasing the rockshaft and the tripper pins in the clockwise direction. A lever 174 is provided which is pivotally movable about transverse pivot pin 176. The lever 174 has two V-shaped notches at the top for receiving the arm 170, the notch at the right as shown in Figs. 1 and 12 being shallower than the notch at the left. When the arm 170 is in the shallower notch at the left as shown in Fig. 1, the several tripper pins are held in the positions shown in Figs. 3 and 10. When the arm 170 is in the deeper notch at the left as shown in Fig. 12, the several tripper pins are held in the positions shown in Fig. 11.

A ratchet wheel 178 is provided adjacent the lower end of the lever 174, the ratchet wheel being rotatable about a transverse axis. The lower part of the lever 174 is provided with a groove 180 for the passage of two pins 182 and 184 on the ratchet wheel, this groove having converging walls. When the pin 184 passes through the groove 180, as shown in Fig. 1, the lever 174 is so positioned that the arm 170 is in the shallower notch and the several tripper pins are in the positions shown in Figs. 3 and 10. When the pin 184 passes through the groove 180, as shown in Figs. 12 and 13, the lever 174 is so positioned that the arm 170 is in the deeper notch and the several tripper pins are in the positions shown in Fig. 11.

A suitable mechanism, not shown, is provided for engaging the teeth of the ratchet wheel and for moving the wheel to the extent of one tooth during each cycle of the mechanism. As shown, the ratchet wheel has 21 teeth and the lever 174 and the several tripper pins are in the positions of Figs. 3 and 10 during 11 cycles with the pins 160 and 164 vertical, and are in the positions of Fig. 11 during 10 cycles with the pins 162 and 166 vertical.

Figure 14:
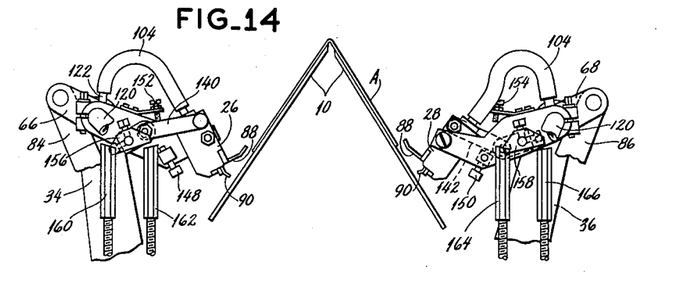
Fig. 14 is a view similar to the upper portion of Fig. 9 but showing some of the parts in different positions.

For the example given, the mechanism operates through 11 cycles as previously described, thus transferring 11 signatures having their wider sections at the right. During the 11th cycle the tripper pins are shifted from the Fig. 10 positions to the Fig. 11 positions. As the shift dogs 156 and 158 approach the Fig. 14 positions at the end of the 11th cycle, the right end portions thereof engage the tripper pins 162 and 166 which have been moved to vertical positions. The shift dog 156 is turned counterclockwise to shift the gripper unit 26 from the relative positions shown in Fig. 9 to the relative positions shown in Fig. 14, the links 140 engaging stops 152. The shift dog 158 is turned counterclockwise to shift the gripper units 28 from the relative positions shown in Fig. 9 to the relative positions shown in Fig. 14, the links 142 engaging the stops 150. It will be observed that on account of the overcenter action of the springs 142, the right ends of the dogs 156 and 158 after engaging the pins 162 and 166 are additionally moved so as to be out of contact with the said pins as shown in Fig. 14.

Fig. 15 shows the parts in positions generally similar to those shown in Fig. 1, but the dogs 156 and 158 and the gripper units 26 and 28 have been relatively shifted as explained in connection with Fig. 14. The action of the gripper units is the same as previously explained, except that the left finger 90 is now below the right finger 90 to accommodate the signatures with the wider sections at the left. When the parts move from the Fig. 14 position to the Fig. 15 positions during the immediately following cycles, the right end portions of the shift dogs contact or approximately contact pins 162 and 166, but the outer end portions of the dogs move behind the pins 160 and 164 without engaging them, the said pins being inclined toward the front.

During the 10th following cycle, the several tripper pins are shifted back to the positions shown in Figs. 3 and 10. As the shift dogs 156 and 158 approach the Fig. 9 positions at the end of the 10th cycle, the left end portions thereof engage the tripper pins 160 and 162 which have been moved to vertical positions. The shift dog 156 is turned clockwise to shift the gripper units 26 from the relative positions shown in Fig. 14 to the relative positions shown in Fig. 9, the links 140 engaging the stops 148. The shift dog 158 is turned clockwise to shift the gripper units 28 from the relative positions shown in Fig. 14 to the relative positions shown in Fig. 9, the links 142 engaging the stops 154. It will be observed that on account of the overcenter action of the springs 142, the left ends of the dogs 156 and 158 after engaging the pins 160 and 164 are additionally moved so as to be out of contact with the said pins as shown in Fig. 9.

The described relative shiftings of the gripper units 26 and 28 are repeated indefinitely in accordance with the said pattern.

*Mechanism as shown in Figs. 16 to 22*

Figs. 16 to 22 show an alternative mechanism which as to its general organization and manner of operation is similar to that shown in Figs. 1 to 15 and previously described. The alternative mechanism differs in the provision of pneumatic means instead of mechanical means for periodically adjusting the gripper units.

Figure 16:
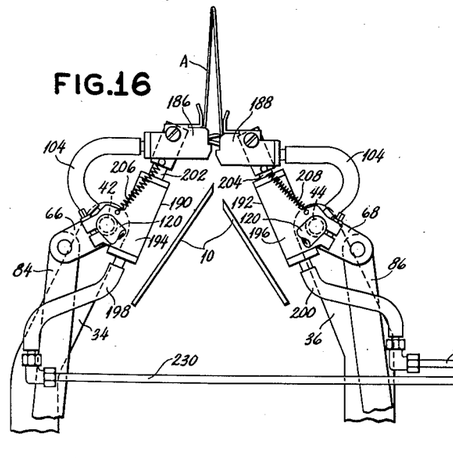
Fig. 16 is a fragmentary side view similar to the upper left portion of Fig. 1 but showing an alternative embodiment of the invention.
Figure 20:
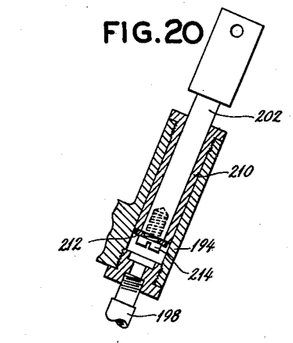
Fig. 20 is an enlarged fragmentary vertical sectional view of the pneumatic device for supporting and actuating the left gripper unit as shown in Figs. 16 and 18.

Referring particularly to Figs. 16 and 20, two gripper units 186 and 188 are provided which are similar to the gripper units 26 and 28 except as to the connection thereof with the supporting and actuating means therefor. There are two pairs of units 186 and 188, the units being arranged in the same manner as the units 26 and 28 shown in Fig. 3. Two pneumatic devices 190 and 192 are provided for supporting and actuating the gripper units, these two devices being similar in construction and one of them being shown in detail in Fig. 20. While the invention is not so limited, the pneumatic devices 190 and 192 are shown as operable by pressure and not suction.

Connected respectively to the shafts 42 and 44 are brackets which constitute the supporting members for the gripper units and which include upwardly and inwardly inclined pneumatic cylinders 194 and 196, these cylinders being connected with flexible air hoses 198 and 200. The cylinders 194 and 196 are provided respectively with plungers 202 and 204 to which the respective gripper units 186 and 188 are rigidly connected, the plungers being movable lengthwise of the cylinders. The plungers are movable upwardly by air pressure and they are movable downwardly by springs 206 and 208.

As shown in Fig. 20, each air cylinder 194 and 196 is provided with a bushing 210 having its lower end above the bottom of the cylinder. A washer 212 is secured to the bottom of the plunger 202 by a screw 214. When air under pressure is supplied through the hose 198, the plunger 202 and the gripper unit 186 carried thereby are moved upwardly, the washer 212 engaging the lower end of the bushing 210 to limit upward movement. When the air pressure is released, the plunger and the gripper unit are moved downwardly by the spring 206.

Figure 17:
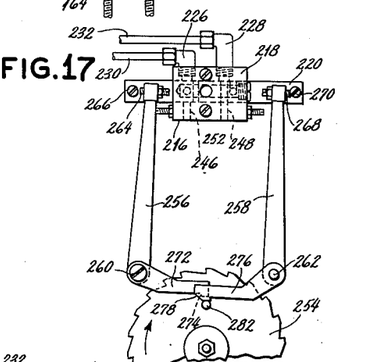
Fig. 17 is a side view showing a valve and valve operating mechanism for the alternative construction shown in Fig. 16.
Figure 18:
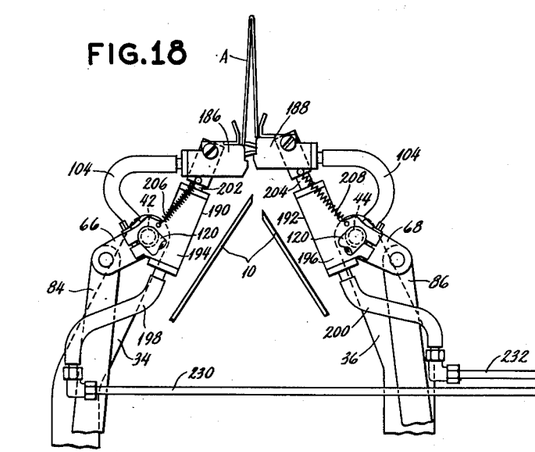
Fig. 18 is a view similar to Fig. 16 but showing some of the parts in different positions, the parts being in positions similar to those shown in Fig. 15.
Figure 19:
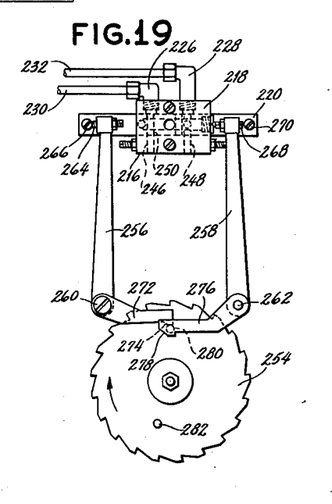
Fig. 19 is a view similar to Fig. 17 but showing the valve and valve operating mechanism in positions corresponding to the positions of the parts as shown in Fig. 18.
Figure 21:
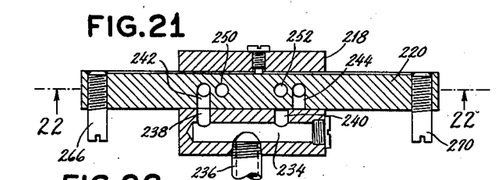
Fig. 21 is an enlarged horizontal sectional view of the valve, this view being taken along the line 21—21 of Fig. 20.
Figure 22:
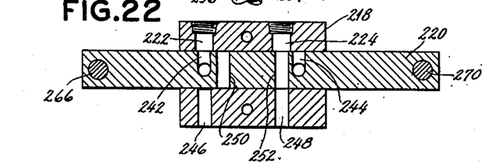
Fig. 22 is a vertical sectional view taken along the line 22—22 of Fig. 21.

A valve 216 is provided for controlling the supply of air to the cylinders 190 and 192 so as to adjust the relative positions of the gripper units. The valve may be carried by the face of the frame 30 which is shown in the right portion of Fig. 1. As shown, the valve 216 includes a stationary body 218 and a slide 220 horizontally movable through the body. When the slide is in its right position, as shown in Figs. 17, 21 and 22, air is supplied through the hose 198 to maintain the left plunger 202 and the left gripper unit 186 in their upper positions, as shown in Fig. 16, the right plunger 204 and the right gripper unit 188 being in their lower positions. When the slide 220 is in its right position, as shown in Fig. 19, air is supplied through the hose 200 to maintain the right plunger 204 and the right gripper unit 188 in their upper positions as shown in Fig. 18, the left plunger 202 and the left gripper unit 186 being in their lower positions.

The valve body 218 has two longitudinally spaced holes 222 and 224 in the top thereof which extend to the slide 220 and which communicate respectively with elbow fittings 226 and 228. Pipes 230 and 232 serve respectively to connect the fittings 226 and 228 with the hoses 198 and 200 and also with the similar hoses for the gripper units of the other pair. The front of the body 218 has a longitudinal hole 234 as shown in Fig. 21, and air under regulated pressure is supplied to the hole 234 through a pipe 236. Two longitudinally spaced holes 238 and 240 communicate with the hole 234 and extend to the slide 220. The slide 220 has communicating horizontal and vertical holes 242 which connect the hole 238 with the hole 222 when the slide is in its right position. The slide has communicating horizontal and vertical holes 244 which connect the hole 240 with the hole 224 when the slide is in its left position.

The valve body 218 has two longitudinally spaced vent holes 246 and 248 and the slide 220 has two longitudinally spaced vertical holes 250 and 252. When the slide is in its right position, the hole 252 registers with the hole 224 and with the vent hole 248 so as to release air pressure in the right cylinder 196. When the slide is in its left position, the hole 250 registers with the hole 222 and with the vent hole 246 to release air pressure in the left cylinder 194.

For moving the slide 220 of the valve 216 there is provided a ratchet wheel 254 similar to the ratchet wheel 178 and similarly actuated. Two similar levers 256 and 258 are provided for moving the valve slide, these levers being movable about fixed horizontal axes at 260 and 262. The lever 256 has an adjustable screw 264 which is engageable with a pin 266 on the slide 220 for moving the slide toward the left when the said lever 256 is moved counterclockwise. The lever 258 has an adjustable screw 268 which is engageable with a pin 270 on the slide 220 for moving the slide toward the right when the said lever 258 is moved clockwise.

Connected with the lever 256 is a lever 272 having a cam surface 274 adjacent the front of the ratchet wheel 254. Connected with the lever 258 is a lever 276 having a cam surface 278 also adjacent the front of the ratchet wheel but in front of the cam surface 274 on the lever 272 and at a lower level. Secured to the ratchet wheel 254 are two pins 280 and 282 spaced similarly to the pins 182 and 184 on the ratchet wheel 178. The pin 282 is relatively long and is engageable with the cam surface 278 on the lever 276 as shown in Fig. 17. The pin 280 is relatively short and is engageable with the cam surface 274 on the lever 272 as shown in Fig. 19, the length of the pin 280 being such that it can move behind the lever 276.

With the gripper units 186 and 188 in their first relationship as shown in Fig. 16, the valve slide 220 is in its right position shown in Figs. 17, 21 and 22. With the gripper units in the said first relationship, the feeding mechanism operates through 11 cycles in the manner previously described in connection with Figs. 1, 5 and 6. At the end of the 11th cycle the pin 280 moves to the position shown in Fig. 19 and in so moving it moves the levers 272 and 256 in the counterclockwise direction so as to move the slide 220 toward the left. As the slide moves toward the left, the holes 242 in the slide move out of register with the holes 238 and 222 and the hole 250 in the slide moves into register with the holes 246 and 222.

Thus the air pressure in the cylinder 194 is released and the plunger 202 and the gripper unit 186 are moved to their lower positions. At the same time the hole 252 in the slide moves out of register with the holes 248 and 224 and the holes 244 in the slide move into register with the holes 240 and 224. Thus air pressure is supplied to the cylinder 196, and the plunger 204 and the gripper unit 188 are moved to their upper positions. The gripper units are then in their second relationship as shown in Fig. 18.

With the gripper units in their said second relationship the feeding mechanism operates through 10 cycles in the manner previously described in connection with Figs. 14 and 15. At the end of the 10th cycle the pin 282 moves to the position shown in Fig. 17 and in so moving it moves the levers 276 and 258 in the clockwise direction so as to move the slide 220 toward the right. The valve then acts through the cylinders 194 and 196 to restore the gripper units to their first relationship as shown in Fig. 16.

The described relative shiftings of the gripper units 186 and 188 are repeated indefinitely in accordance with the said pattern.

The invention claimed is:

1. A mechanism for transferring book signatures from a transfer position wherein the said signatures are located with their sections extending downwardly at opposite sides of a central plane, the said mechanism comprising two gripper units at opposite sides of said plane and each having an abutment and each having a finger movable relatively to the abutment which finger has an open releasing position in which it is spaced from the abutment and a closed gripping position in which it is closely adjacent the abutment, cyclically operable means for supporting the gripper units and for reciprocating them between upper gripping positions and lower releasing positions, the last said means being constructed and arranged to so reciprocate the units along downwardly diverging and upwardly converging paths while maintaining said units in generally upright positions and said units when in the said upper positions being closely spaced with their abutments respectively adjacent the lower portions of the sections of a signature in the said transfer position, and cyclically operable means for relatively moving the fingers of the units to their said closed positions for gripping the signature sections when the gripper units are in their said upper positions and for relatively moving the fingers to their said open positions for releasing the signature sections when the gripper units are near their said lower positions.

2. A mechanism for transferring book signatures from a transfer position wherein the said signatures are located with their sections extending downwardly at opposite sides of a central plane, the said mechanism comprising two gripper units at opposite sides of said plane and each having an abutment and each having a finger movable relatively to the abutment which finger has an open releasing position in which it is spaced from the abutment and a closed gripping position in which it is closely adjacent the abutment, cyclically operable means for supporting the gripper units and for moving them between upper gripping positions and lower releasing positions, the units when in the said upper positions being closely spaced with their abutments respectively adjacent the lower portions of the sections of a signature in the said transfer position, pneumatic means for relatively moving the fingers of the units to their said closed and open positions, and cyclically operable controlling means for the said pneumatic means causing the latter to move the fingers of the units to their said closed positions for gripping the signature sections when the gripper units are moved to their said upper positions and to move the fingers to their said open positions for releasing the signature sections when the gripper units are near their said lower positions.

3. A mechanism for transferring book signatures from a transfer position wherein the said signatures are located with their sections extending downwardly at opposite sides of a central plane, the said mechanism comprising two gripper units at opposite sides of the said plane and each having an abutment facing the said plane and each having a finger pivotally movable about an axis parallel to the said central plane which finger has an open releasing position in which it is approximately perpendicular to the abutment and a closed gripping position in which it is closely adjacent the abutment, cyclically operable means for supporting the gripper units and for reciprocating them between upper gripping positions and lower releasing positions, the last said means being constructed and arranged to so reciprocate the units along downwardly diverging and upwardly converging paths while maintaining said units in generally upright positions and said units when in the said upper positions being closely spaced with their abutments respectively adjacent the lower portions of the sections of a signature in the said transfer position, and cyclically operable means for relatively moving fingers of the units to their said closed positions for gripping the signature sections when the gripper units are in their said upper positions and for relatively moving the fingers to their said open positions for releasing the signature sections when the gripper units are near their said lower positions.

4. A mechanism for transferring book signatures as set forth in claim 3, wherein each gripper unit comprises a housing having a longitudinal cylindrical chamber, a piston longitudinally movable in the chamber, a rack longitudinally movable with the piston and gearing engaging the rack and serving to pivotally move the finger upon longitudinal movement of the piston and the rack, and wherein the cyclically operable means includes means for varying the air pressure in the chamber so as to cause the piston to move longitudinally with resultant pivotal movement of the finger.

5. A mechanism for transferring book signatures from a transfer position wherein the said signatures are located with their sections extending downwardly at opposite sides of a central transverse plane, the said mechanism comprising two gripper units at opposite sides of said plane and offset from each other transversely so as to be out of longitudinal register, each of the said units having an abutment and each of them having a finger movable relatively to the abutment which finger has an open releasing position in which it is spaced from the abutment and a closed gripping position in which it is closely adjacent the abutment, cyclically operable means for supporting the gripper units and for reciprocating them between upper gripping positions and lower releasing positions, the last said means being constructed and arranged to so reciprocate the units along downwardly diverging and upwardly converging paths while maintaining said units in generally upright positions and said units when in the said upper positions being closely spaced with their abutments respectively adjacent the lower portions of the sections of a signature in the said transfer position, and cyclically operable means for relatively moving the fingers of the units to their said closed positions for gripping the signature sections when the gripper units are in their said upper positions and for relatively moving the fingers to their said open positions for releasing the signature sections when the gripper units are near their said lower positions.

6. A mechanism for transferring book signatures from a transfer position wherein the said signatures are located with their sections extending downwardly at opposite sides of a central transverse plane, the said mechanism comprising two transversely spaced pairs of gripper units arranged with the units of each pair at opposite sides of the said plane and offset from each other transversely so as to be out of longitudinal register with each other, each of the said units of each pair having an abutment and each of them having a finger movable relatively to the abutment which finger has an open releasing position in which it is spaced from the abutment and a closed gripping position in which it is closely adjacent the abutment, cyclically operable means for supporting the gripper units and for reciprocating them between upper gripping positions and lower releasing positions, the last said means being constructed and arranged to so reciprocate the units along downwardly diverging and upwardly converging paths while maintaining said units in generally upright positions and said units when in the said upper positions being closely spaced with their abutments respectively adjacent the lower portions of the sections of a signature in the said transfer position, and cyclically operable means for relatively moving the fingers of the units to their said closed positions for gripping the signature sections when the gripper units are in their said upper positions and for relatively moving the fingers to their said open positions for releasing the signature sections when the gripper units are near their said lower positions.

7. A mechanism for transferring book signatures having sections of different widths from a transfer position wherein the said signatures are located with their sections extending downwardly at opposite sides of a central plane, the said mechanism comprising two units located at opposite sides of the said plane and including means for respectively gripping the lower portions of the sections of a signature in the transfer position, cyclically operable means for supporting the gripper units and for reciprocating them along downwardly diverging and upwardly converging paths between upper gripping positions and lower releasing positions and for moving the units generally longitudinally toward each other as they approach the said upper gripping positions which means serves to move one gripper unit as it approaches its gripping position into engagement with the wider signature section with resultant separation of the sections, and cyclically operable means for causing the gripping means of the gripper units to grip the signature sections after separation thereof and when the said units are in their said upper gripping positions and for causing the gripping means of the said units to release the signature sections when the said units are near their said lower releasing positions.

8. A mechanism for transferring book signatures having sections of different widths from a transfer position wherein the said signatures are located with their sections extending downwardly at opposite sides of a central plane, the said mechanism comprising two gripper units at opposite sides of the said plane and each having an abutment facing the said plane and each having a finger pivotally movable about an axis parallel to the said plane which finger has an open releasing position in which it is approximately perpendicular to the abutment and a closed gripping position in which it is closely adjacent the abutment, cyclically operable means for supporting the gripper units and for moving them between upper gripping positions and lower releasing positions and for moving the units generally longitudinally toward each other as they approach the said upper gripping positions which means serves to locate the said units with their open fingers at different levels as they approach the said upper gripping positions so that the higher of the two fingers passes under the narrower section of a signature in the said transfer position and engages the lower portion of the wider section of the said signature with resultant separation of the sections, and cyclically operable means for pivotally moving the fingers of the units to their said closed positions for gripping the signature sections when the gripper units are in their said upper positions and for pivotally moving the said fingers to their said open positions for releasing the signature sections when the gripper units are near their said lower positions.

9. A mechanism for transferring book signatures having sections of different widths from a transfer position wherein the said signatures are located with their sections extending downwardly at opposite sides of a central plane and wherein the wider signature section may be at either side of the said plane, the said mechanism comprising two gripper units located at opposite sides of the said plane and including means for respectively gripping the lower portions of the sections of a signature in the transfer position, cyclically operable means for supporting the gripper units and for moving them between upper gripping positions and lower releasing positions which means is adjustable to change the levels of the signature engaging portions of the units so that whichever unit is opposite the wider section of a signature in the transfer position has its signature engaging portion higher than that of the other unit as the units approach the said gripping positions to enable the higher unit to move into engagement with the lower portion of the wider signature section with resultant separation of the sections, and cyclically operable means for causing the gripping means of the gripper units to grip the signature sections after separation thereof and when the said units are in their said upper gripping positions and for causing the gripping means of the said units to release the signature sections when the said units are near their said lower releasing positions.

10. A mechanism for transferring book signatures having sections of different widths from a transfer position wherein the said signatures are located with their sections extending downwardly at opposite sides of a central plane and wherein the wider signature section may be at either side of the said plane, the said mechanism comprising two gripper units located at opposite sides of the said plane and each having an abutment facing the said plane and each having a finger pivotally movable about an axis parallel to the said plane which finger has an open releasing position in which it is approximately perpendicular to the abutment and a closed gripping position in which it is closely adjacent the abutment, movable members for respectively supporting the gripper units, cyclically operable means for supporting the supporting members and for moving them so as to move the gripper units between upper gripping positions and lower releasing positions and so as to move the units generally longitudinally toward each other as they approach the said upper gripping positions, means for holding each gripper unit in either of two relationships with its supporting member so that the open finger of whichever unit is opposite the wider section of a signature in the transfer position is at a higher level than that of the other unit as the units approach the said gripping positions, the said higher finger passing under the narrower section of the signature and engaging the said wider section thereof with resultant separation of the sections, and cyclically operable means for pivotally moving the fingers of the units to their said closed positions for gripping the signature sections when the gripper units are in their said upper positions and for pivotally moving the said fingers to their said open positions for releasing the signature sections when the gripper units are near their said lower positions.

11. A mechanism for transferring book signatures as set forth in claim 10, wherein the means for holding each gripper unit in either of two positions with respect to its supporting member is a toggle device having an overcenter action, and wherein a spring is provided for each toggle device to hold the corresponding unit in either of the said two positions.

12. A mechanism as set forth in claim 11, wherein there are two transversely aligned gripper units at each side of the said central plane, wherein there are two transversely aligned supporting members for the said units at opposite sides of the said central plane, wherein there is a common means connected with the supporting members at one side of the said plane for moving the two corresponding gripper members to either of two positions with respect to their supporting members, and wherein there is a common means at the other side of the said plane for moving the other two corresponding gripper members to either of two positions with respect to their supporting members.

13. A mechanism for transferring book signatures as set forth in claim 10, wherein the supporting member for each gripper unit includes a pneumatic cylinder, wherein the means for holding each gripper unit in either of two positions with respect to its supporting member includes a plunger connected with the unit and longitudinally movable in the said cylinder, and wherein means is provided for varying the air pressure in each cylinder to move the corresponding plunger and the unit.

14. A mechanism for transferring book signatures having sections of different widths from a transfer position wherein the said signatures are located with their sections extending downwardly at opposite sides of a central plane and wherein the wider signature section may be at either side of the said plane, the said mechanism comprising two gripper units located at opposite sides of the said plane and including means for respectively gripping the lower portions of the sections of a signature in the transfer position, cyclically operable means for supporting the said gripper units and for moving them between upper gripping positions and lower releasing opsitions and for causing one of them to separate the sections of the signature as the units approach the said gripping positions, cyclically operable means for causing the gripping means of the gripper units to grip the signature sections after separation thereof and when the said units are in their said upper gripping positions and for causing the gripping means of the said units to release the signature sections when the said units are near their said lower releasing positions, and periodically operable means acting automatically after predetermined numbers of cycles for adjusting the gripper units to enable one or the other of them to separate signatures arranged in successive groups with the wider sections of the signatures in the several groups at successively opposite sides of the said control plane.

15. A mechanism for transferring book signatures as set forth in claim 14, wherein the means for supporting and moving the gripper units includes movable supporting members with which the said units are relatively movably connected, and wherein the periodically operable means serves to move the gripper units relatively to their supporting members so that the signature engaging portions of the said units are successively at different levels.

16. A mechanism for transferring book signatures as set forth in claim 15, wherein the gripper units are pivotally connected with their supporting members and are relatively moved pivotally by the said periodically operable means.

17. A mechanism for transferring book signatures as set forth in claim 16, wherein a toggle device and an overcenter spring is provided for holding each unit in either of two positions with respect to its supporting member.

18. A mechanism for transferring book signatures as set forth in claim 17, wherein the periodically operable means is connected with the toggle devices for relatively moving one element of each device and for thus pivotally moving the units relatively to their supporting members.

19. A mechanism for transferring book signatures as set forth in claim 15, wherein the movable supporting members for the units include pneumatic cylinders, wherein plungers are connected respectively with the gripper units and are longitudinally movable respectively in the said cylinders, and wherein the periodically operable means for relatively moving the gripper units is constructed and arranged to vary the air pressure in the cylinders to effect said moving.

20. A mechanism for transferring book signatures having sections of different widths from a transfer position wherein the said signatures are located with their sections extending downwardly at opposite first and second sides of a central plane and wherein the wider signature section may be at either side of the said plane, the said mechanism comprising first and second gripper units located at the said first and second sides of the said plane and including means for respectively gripping the lower portions of the sections of a signature in the transfer position, cyclically operable means for supporting the said first and second gripper units and for moving them between upper gripping positions and lower releasing positions which means is adjustable to relatively shift the units so that they have either a first relationship or a second relationship with respect to each other when approaching the said upper gripping positions, the said units in the first relationship having the signature engaging portion of the first unit higher than that of the second unit for engaging and separating a wider signature section at the second side and the said units in the second relationship having the signature engaging portion of the second unit higher than that of the first unit for engaging and separating a wider signature section at the first side, periodically operable means acting automatically after a first predetermined number of cycles for shifting the units from the first relationship to the second relationship and acting automatically after a second predetermined number of cycles for shifting the units from the second relationship to the first relationship, and cyclically operable means for causing the gripping means of the gripper units to grip the signature sections after separation thereof and when the said units are in their said upper gripping positions and for causing the gripping means of the said units to release the signature sections when the said units are near their said lower releasing positions.

21. A mechanism for transferring book signatures as set forth in claim 20, wherein the periodically operable means for adjusting the gripper units includes a rotatable wheel having complete revolution during the said first and second predetermined numbers of cycles, wherein two circumaxially spaced pins are provided on the rotatable wheel, and wherein means are provided operable by one pin for shifting the gripper units from the first relationship to the second relationship and operable by the other pin for shifting the gripper units from the second relationship to the first relationship.

22. A mechanism for transferring book signatures as set forth in claim 20, wherein the means for supporting and moving the gripper units includes movable first and second supporting members for the first and second units, wherein each of the units is connected with its corresponding supporting member for movement into either of two positions with respect thereto, wherein two bodily movable shift dogs are carried by the means for supporting and moving the gripper units, wherein each dog is pivotally movable and is connected with a corresponding unit for moving it into either of its said positions with respect to its supporting member, and wherein the periodically operable means for shifting the units comprises members which engage the dogs as they move bodily and which pivotally move the dogs to cause them to shift the units.

23. A mechanism for transferring book signatures as set forth in claim 22, wherein the periodically acting means includes four pins in fixed relation with each other, two of the pins being adapted to be engaged by the dogs for pivotally moving the said dogs in one direction and the other two of the pins being adapted to be engaged by the dogs for pivotally moving the said dogs in the opposite direction, and wherein the periodically acting means also includes mechanism for periodically moving the pins to alternately move the first two pins and the second two pins into dog engaging positions.

24. A mechanism for transferring books as set forth in claim 23, wherein the mechanism for periodically moving the dog engaging pins includes a rotatable wheel having a complete rotation during the period intervening between successive shiftings of the units to one of the said relationships, and wherein the last said mechanism also includes circumaxially spaced pins on the said wheel for moving the dog engaging pins alternately.

25. A mechanism for transferring book signatures as set forth in claim 20, wherein the means for supporting and moving the gripper units include pneumatic cylinders, wherein plungers are connected respectively with the gripper units and are longitudinally movable respectively in the said cylinders, and wherein the periodically operable means for shifting the units from the first relationship to the second relationship and from the second relationship to the first relationship serves to vary the air pressure in the cylinders to effect said shifting.

26. A mechanism for transferring book signatures as set forth in claim 20, wherein the means for supporting and moving the gripper units include pneumatic cylinders, wherein plungers are connected respectively with the gripper units and are longitudinally movable respectively in the said cylinders, and wherein the periodically operable means for shifting the units from the first relationship to the second relationship and from the second relationship to the first relationship includes a rotatable wheel having complete revolution during the said first and second predetermined numbers of cycles and also includes two circumaxially spaced pins on the rotatable wheel and further includes a valve operable by the said pins and serving to vary the air pressure in the cylinders for relatively moving the plungers and the gripper units.

References Cited in the file of this patent

UNITED STATES PATENTS

| Re.21,489 | Kleineberg | June 25, 1940 |
| 2,025,527 | Schramm | Dec. 24, 1935 |
| 2,507,281 | Spisak | May 9, 1950 |